Jan. 25, 1966    H. HOFMANN    3,230,941
INTERNAL COMBUSTION ENGINE
Filed April 1, 1964    2 Sheets-Sheet 2

Inventor:
HANS HOFMANN
By K. H. Meyer
ATTORNEY

United States Patent Office 3,230,941
Patented Jan. 25, 1966

3,230,941
INTERNAL COMBUSTION ENGINE
Hans Hofmann, Wiesendangen, Switzerland, assignor to Sulzer Brothers Limited, Winterthur, Switzerland, a corporation of Switzerland
Filed Apr. 1, 1964, Ser. No. 356,490
Claims priority, application Switzerland, Apr. 23, 1963, 5,110/63
8 Claims. (Cl. 123—41.36)

The present invention relates to an internal combustion piston engine having a hollow piston and a tube connected thereto for conducting a coolant, the tube being parallel to the axis of the piston and reciprocating with the piston as well as moving slightly laterally with the piston. The invention relates more particularly to a packing for sealing the tube where it extends into the engine casing, the packing comprising a lipped gasket element surrounding the tube and having a flat annular portion extending normal to the longitudinal axis of the packing.

It is difficult to seal coolant supply and release tubes connected to the pistons of internal combustion engines because these tubes do not only reciprocate with the piston, but also make slight lateral movements with the piston. A small clearance for the piston is provided in the cylinder and the piston moves laterally in said clearance while reciprocating in the cylinder. The lips of conventional lipped packing rings are supposed to take care of these lateral movements but do not do it satisfactorily in many cases.

It is an object of the invention to provide a packing for a coolant-conducting tube rigidly connected to an internally cooled piston of an internal combustion engine whereby the tube can make considerable lateral movements without substantially affecting the sealing efficiency of the packing. The packing according to the invention comprises a cufflike element surrounding the tube and having a flat annular part extending at a right angle from the longitudinal axis of the tube. The cufflike element is mounted on a bushing surrounding the tube and mounted at a clearance in the engine casing, the clearance permitting lateral movement of the bushing within the casing. The flat annular part of the cufflike element rests and is radially slidable on a plane surface of the engine casing which surface is normal to the longitudinal axis of the tube.

The cufflike element is preferably made of a yielding material. For additional guidance of the tube and protection of the cufflike element, a rigid guide element surrounding the tube is mounted on the aforedescribed bushing adjacent the flat annular part of said cufflike element and has a guide surface portion adjacent the tube. This guide element may have an annular part mounted on the bushing and protuberances extending from the annular part longitudinally of the tube and being equally distributed therearound. The protuberances extend longitudinally of the tube beyond the cufflike element and have tube guiding portions adjacent the tube.

The cufflike element is preferably made of synthetic material and the cuff portion of the element may be made of a yielding material whereas the flat annular part is made of a different and relatively rigid material.

The novel features which are considered characteristic of the invention are set forth with particularity in the appended claims. The invention itself, however, and additional objects and advantages thereof will best be understood from the following description of embodiments thereof when read in connection with the accompanying drawing wherein:

Figure 1:
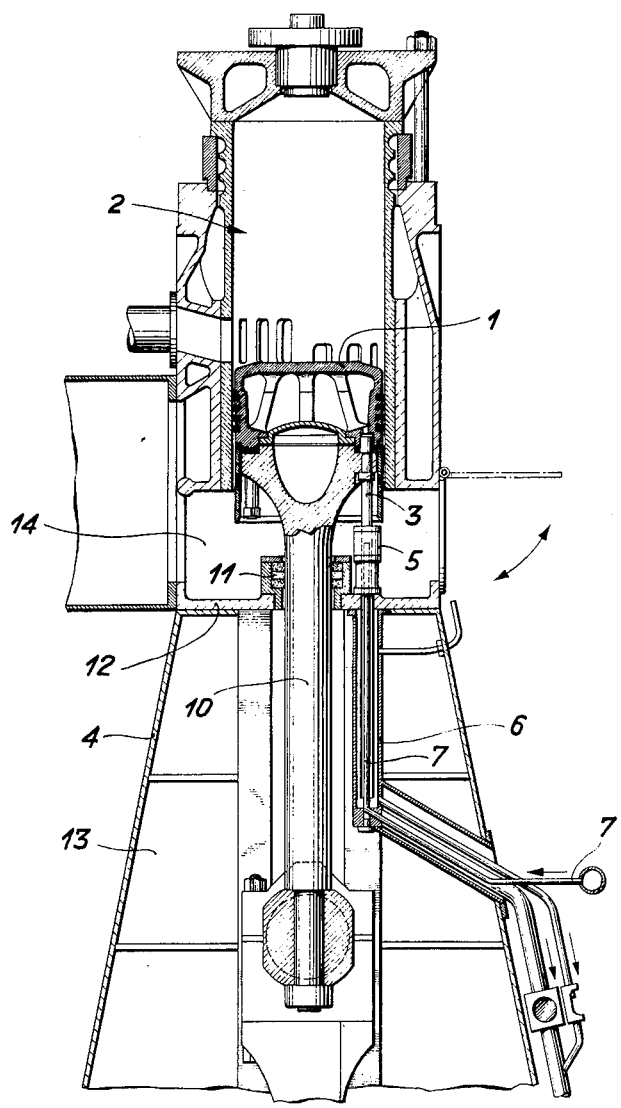
FIG. 1 is a part-sectional elevation of a two-stroke diesel engine equipped according to the invention.

Referring more particularly to FIG. 1 of the drawing, numeral 1 designates a hollow piston forming part of an engine 2 and having tubes 3 connected thereto for supplying liquid coolant to and releasing coolant, for example water, from the interior of the piston 1. The tubes 3 extend through a wall of the engine casing 4 into a chamber 6 through packings 5 mounted on the engine casing. A pipe 7 for supplying coolant by injection and a corresponding pipe for releasing the coolant are arranged in the chamber 6. The illustrated internal combustion piston engine is of the type wherein a piston rod 10 extends through a packing 11 in a wall 12 which separates a crank chamber 13 from an air chamber 14 located below the engine cylinder. The air chamber receives air at superatmospheric pressure which serves for scavenging and charging the interior of the engine cylinder.

Figure 2:
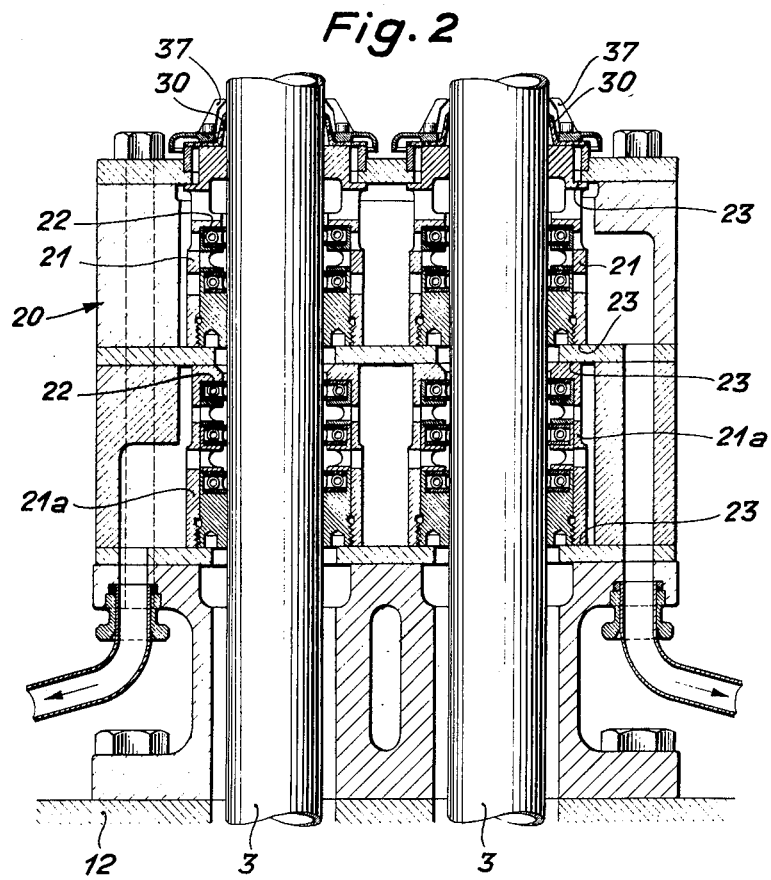
FIG. 2 is a large scale sectional elevation of a portion of the engine shown in FIG. 1.

FIG. 2 illustrates the packing 5 shown in FIG. 1 on an enlarged scale. The packing includes a multipartite casing 20 mounted on the separating wall 12, and guiding bushings 21, 21a provided with packing rings 22 and supporting packings which will be described below. The bushings 21, 21a snugly fit around the tubes 3, permitting axial movement of the tubes in the bushings. The bushings 21, 21a are laterally slidable in the casing 20 on guide surfaces 23 which are normal to the longitudinal axes of the tubes 3. The tubes 3 are sealed against the air pressure in the chamber 14 by cufflike elements 30 which are shown on larger scale in FIG. 3. Each element 30 has a cuff portion 31 surrounding a tube 3 and a flat annular portion 32 extending normal to the longitudinal axis of the respective tube. The annular portion 32 is pressed against the top of the upper bushing 21 by an annular element 33 which is made fast on the bushing 21 by screws 34. The plane annular portion 32 rests on a sealing surface 35 formed on a ring 36 supported by the casing 20. The annular element 33 has protuberances 37 which are arranged around the cuff portion 31 and whose ends are so close to the tube 3 that there is only a very small clearance between the ends of the protuberances and the tube 3. The bushing 21 is preferably provided with a lining 40 made of bearing metal. When the tube 3 reciprocates together with the piston 1 during normal operation of the engine the cuff 31 abuts the outer surface of the tube and is pressed thereagainst by the pressure of the air in the chamber 14 whereby the cuff 31 seals in the conventional manner. Radial movement of the tube 3 causes movement of the bushing 21 with the packing 30 on the guide surface 23 in a direction normal to the longitudinal axis of the tube. Therefore, the cuff 31 moves radially together with the tube 3 and does not make appreciable radial movements relative to the tube 3. This assures satisfactory function of the packing during extended periods of operation. Sealing between the bushing 21 and the casing 20, which is stationary, is effected by the abutment of the plane annular portion 32 of the cufflike element against the sealing surface 35 of the ring 36. The plane portion 32 of the cufflike element is pressed against the surface 35 by the air pressure in the chamber 14 and produces a sealing action which is effective also during movement of the bushing 21 on the guide surfaces 23.

The protuberances 37 protect the cuff 31 against damage, for example, when the bushing 21 is removed and facilitate insertion of the tube 3 into the cuff 31 when the device is assembled. Damage to the cuff 31 by the tube 3 caused by careless insertion of the latter is prevented by the protuberances 37.

The application of the invention is not limited to the described and illustrated example. Instead of the protuberances 37 an annular part snugly surrounding the tube may be provided whereby the tube is guided on each side of the cuff 31 by a cylindrical bearing surface.

Figure 3:
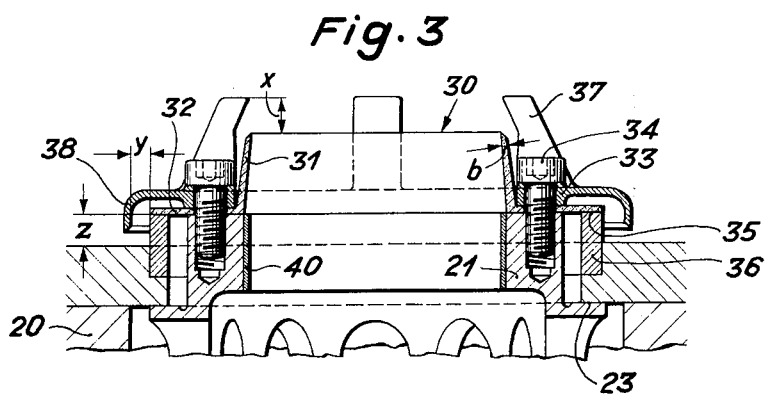
FIG. 3 shows the upper portion of FIG. 2 on a larger scale.

In the embodiment of the invention shown in FIG. 3 a plurality of protuberances 37, at least three, are equally distributed around the tube. This provides better accessibility of the cufflike packing element. When assembling the packing the insertion of the end of the tube 3 into the cuff can be observed. It is of advantage to make the end of the tube 3 conical and to make the distance $x$ shown in FIG. 3 between the guiding end of the protuberance 37 and the end of the cuff 31 shorter than the conical end of the tube 3. In this way damage of the cuff when inserting the tube 3 is prevented.

The cufflike element 30 may be made in one piece, as shown. In certain cases it is of advantage to make the cuff portion 31 and the flat annular portion 32 of different materials. It is of particular advantage to make the cuff portion of a material, for example nylon, which has a certain yieldability under mechanical stress. The cuff is initially made with an internal diameter which is smaller than the external diameter of the tube 3. When the tube is inserted into the cuff the latter is stretched by a few tenths of a millimeter. If, for example, the cuff were made of a metallic material the inside thereof would be worn and the inside diameter of the cuff would increase until the initially applied tension would disappear. Synthetic materials, for example nylon, adapt themselves to the interior stress in the cuff caused by the pressure produced by the compressed air in the chamber 14, without wearing down. It has been found that the inner diameter of the cuff 31 is not increased by wear, if the cuff is made of synthetic material; the inner diameter of the cuff did not change whereas the thickness $b$ of the cuff decreased due to yielding or flowing.

As said before, the flat annular part 32 may be made of the same material as the cuff 31. However, it may be made of a different material, for example, metal.

The annular portion 33 pressing the annular portion 32 of the cufflike element 30 against the bushing 21 is provided with a bent-down rim 38 which extends downward below the elevation of the sealing surface 35 of the ring 36. The distance $y$ of the bent-down rim 38 from the ring 36 is preferably so great that movement of the bushing 21 normal to the longitudinal axis of the tube 3 is not impaired by this rim. The bent-down rim protects the flat annular part of the cufflike packing ring from damage, also when the packing is removed as a whole. The rim 38 prevents access of oil, which adhered to the tube 3 and was wiped off by the cuff 31, to the sealing surface 35. The elevation $z$ (FIG. 3) of the sealing surface 35 above the top surface of the casing 20 is preferably such that an oil level formed by the wiped off oil is lower than the surface 35.

I claim:

1. An internal combustion engine comprising:
   an internally cooled piston,
   a tube rigidly connected to said piston for supplying coolant to and releasing coolant from said piston,
   an engine casing having a wall,
   said tube extending through said wall,
   a packing surrounding said tube adjacent said wall, said packing comprising:
      a bushing surrounding said tube and being laterally movably supported by said casing, and
      a cufflike element surrounding said tube and having a flat plane annular portion normal to the longitudinal axis of said tube, said cufflike element being mounted on said bushing,
   said engine casing having a plane surface portion normal to the longitudinal axis of said tube and slidably guiding said annular portion of said cufflike element.

2. An internal combustion engine as defined in claim 1 wherein said engine casing has a plane surface portion normal to the longitudinal axis of said tube and radially slidably guiding said bushing.

3. An internal combustion engine according to claim 2 wherein said casing has a part adjacent said cufflike element and both said plane surface portions are formed on said part of said casing.

4. An internal combustion engine as defined in claim 1 wherein said cufflike element is made of synthetic material.

5. An internal combustion engine as defined in claim 1 wherein said cufflike element has a cuff portion, said cuff portion and said flat annular portion being made of different materials.

6. An internal combustion engine comprising:
   an internally cooled piston,
   a tube rigidly connected to said piston for supplying coolant to and releasing coolant from said piston,
   an engine casing having a wall,
   said tube extending through said wall,
   a packing surrounding said tube adjacent said wall, said packing comprising:
      a bushing surrounding said tube and being laterally movably supported by said casing,
      a cufflike element surrounding said tube and having a flat plane annular portion normal to the longitudinal axis of said tube, said cufflike element being mounted on said bushing,
   said engine casing having a plane surface portion normal to the longitudinal axis of said tube and slidably guiding said annular portion of said cufflike element, and
   guide means mounted on said bushing adjacent said flat plane annular portion and having portions adjacent said tube.

7. An internal combustion engine as defined in claim 6 wherein said guide means has an annular part mounted on said bushing and a plurality of protuberances extending from said annular part and being equally distributed around said tube and having portions adjacent said tube.

8. An internal combustion engine as defined in claim 6 wherein said bushing has a part snugly fitting around said tube, said flat plane annular portion of said cufflike element and said guide means being mounted on said part of said bushing, said cufflike element being placed between said part of said bushing and said guide means.

References Cited by the Examiner

UNITED STATES PATENTS

| | | | |
|---|---|---|---|
| 1,073,197 | 9/1913 | Westinghouse | 123—41.35 |
| 2,657,678 | 11/1953 | Maybach | 123—41.36 |

FOREIGN PATENTS 337,025   4/1959   Switzerland.

KARL J. ALBRECHT, *Primary Examiner.*